United States Patent [19]
Plettinck et al.

[11] Patent Number: 5,689,349
[45] Date of Patent: Nov. 18, 1997

[54] METHOD AND A DEVICE FOR GENERATING PRINTING DATA IN A COLOR SPACE DEFINED FOR NON-STANDARD PRINTING INKS

[75] Inventors: Lieven Plettinck, Wingene; Jean-Pierre Van De Capelle, Ghent, both of Belgium

[73] Assignee: Barco Graphics N.V., Ghent, Belgium

[21] Appl. No.: 235,671

[22] Filed: Apr. 29, 1994

[30] Foreign Application Priority Data

Apr. 30, 1993 [BE] Belgium ............................ 09300442

[51] Int. Cl.$^6$ ................................................ H04N 1/46
[52] U.S. Cl. ...................... 358/500; 358/515; 358/523; 358/296; 382/162
[58] Field of Search ...................... 358/504, 515, 358/518, 523, 534, 535, 500, 501, 296; 382/162, 167

[56] References Cited

U.S. PATENT DOCUMENTS

| | | |
|---|---|---|
| 4,613,897 | 9/1986 | Stansfield ........................ 358/515 |
| 4,774,567 | 9/1988 | Stansfield et al. ................ 358/515 |
| 4,929,978 | 5/1990 | Kanamori et al. . |
| 5,268,754 | 12/1993 | Van De Capelle et al. ........... 358/527 |

FOREIGN PATENT DOCUMENTS

| | | |
|---|---|---|
| 0398502 | 11/1990 | European Pat. Off. . |
| 0501942 | 9/1992 | European Pat. Off. . |

*Primary Examiner*—Peter S. Wong
*Assistant Examiner*—Derek J. Jardieu
*Attorney, Agent, or Firm*—Cushman, Darby & Cushman IP Group of Pillsbury Madison & Sutro LLP

[57] ABSTRACT

A method and a device for generating printing data wherein a first color separation defined in a first device dependent color space of standard printing inks is converted into a second color separation defined in a second device dependent color space of non-standard printing inks. The conversion is realized by means of a conversion matrix which is multiplied with the first color separation

16 Claims, 4 Drawing Sheets

METHOD AND A DEVICE FOR GENERATING PRINTING DATA IN A COLOR SPACE DEFINED FOR NON-STANDARD PRINTING INKS

BACKGROUND OF THE INVENTION

1. Field of the Invention

The invention relates to a method for generating printing data wherein, starting from a first colour separation of a pixel belonging to a picture to be printed, the first color separation being defined in a first n-dimensional device dependent colour space of standard printing inks, a second colour separation is formed for that same pixel, said second colour separation being defined in a second m-dimensional device dependent colour space of non-standard printing inks.

2. Description of Related Art

The method of the present invention is capable of many applications for printing colour prints, such as packagings or pictures in periodicals or books. The original is scanned by means of a reproduction scanning device in order to record the picture information, that is the content and the colour. Such a scanning device is built to represent the colour separations in a standard format such as for example YMCK (yellow, magenta, cyan, black). However due to quality constraints as well as to the purpose of the picture to be printed, it is not always printed with standard inks such as YMCK. For example, a chocolate manufacturer will prefer an ink set wherein brown ink plays a more dominant part. When, however, printing must be done with such non-standard inks, the operator will have to tune the reproduction scanning device in such a manner that the latter will not provide him the standard first colour separation but a second colour separation which expresses as well as possible the colour separation in a colour space of non-standard inks. For that purpose the operator manipulates the colour correction possibilities of the scanning device.

A drawback of the known method is that the scanning device must be used for a purpose for which it is not suitable, in particular the generation of non-standard colour separations. It further requires either a substantial experience on the part of the operator or the production of a substantial number of test prints in order to obtain a good result with the known method. Both solutions are empirical and have as a consequence that they make the price of the whole process expensive.

SUMMARY OF THE INVENTION

The object of the invention is to provide a method for generating printing data wherein the second colour separation is determined in a more efficient and non-empirical way and a result is that the printing quality remains unchanged or is even increased.

A method according to the invention is therefore characterised in that as first colour separation, a colour separation derived from a standard colour separation is determined and a set of $p(p \geq n)$ different colours is chosen which belong to the colour gamut of the second colour space having at least a predetermined colour distance from each other, and wherein a first and second colour table is determined representing for each colour of the chosen set the colour coordinates respectively expressed in coordinates of the colour space used to represent the first and second colour separation respectively representing the colour coordinates in the first and second device dependent colour spaces, and wherein a first p by p matrix is formed having as each $p_{ij}^{th}$ ($1 \leq i \leq p$; $1 \leq j \leq p$) matrix coefficient the $j^{th}$ colour coordinate of the $i^{th}$ colour such as represented in the first table, and thereafter a second m by p matrix is formed by taking as each $q^{th}$ row ($1 \leq q \leq m$) of that second matrix the coefficients obtained multiplying the inverted first matrix with a third p by 1 matrix representing the $q^{th}$ colour separation of the second colour space of the different colours belonging to the chosen set of p colours, which second colour separation is determined by multiplying the second matrix with the first colour separation.

By choosing a standard colour separation for the first colour separation, the scanning device operates in a way corresponding to the one for which it is designed and will thus provide a reliable result. By using the said second matrix to convert herewith the first colour separation and thus determine the second colour separation, that second colour separation is no longer determined in an empirical manner. A more reliable result for the second colour separation is thus obtained in an efficient way. The choice of the colour set within the second colour space enables the determination of the coefficients of the second matrix in a simple and reliable manner.

The method according to the invention distinguishes itself from the known method by the fact that, contrary to the usual manner for the printer, the scanning device generates a standard colour separation. That standard colour separation forms, contrary to the expected pattern, a good basis for transformation to a second colour separation for non-standard inks.

A first preferred embodiment of a method according to the invention is characterised in that the first and second colour separations are respectively transformed to first and second colour coordinate sets by means of a predetermined mapping fixing the relation between the first and second device dependent colour spaces and the first and second device independent colour spaces, and wherein in the second device independent colour space a target colour coordinate set is formed by mapping said first colour coordinate set towards that second device independent colour space, and wherein thereafter a target function expressed in the second colour separation is determined from the target colour coordinate set and the second colour coordinate set, which target function is subsequently minimised, a further second colour separation is determined with the minimised target function, which further second colour separation substitutes said second colour separation. By determining a target colour coordinate set starting from the first colour separation a reliable reference value is formed in the second device independent space. With respect to that reference value it is now possible to check the reliability of the second colour separation determined on the basis of the second matrix. Minimising the target function offers in turn the possibility to determine a precise second colour separation.

A second preferred embodiment of a method according to the invention is characterised in that, for the picture to be printed, a first set of first colour separations is formed in the first device dependent colour space and a second set of second colour separations is formed in the second device dependent colour space by multiplying each time each first colour separation from the first set with said second matrix, and wherein a third and fourth set are formed by each time respectively transforming each of the first and second colour separations from the first and second sets to each time a first and second colour coordinate set by means of a predetermined mapping establishing the relation between the first and second device independent colour spaces, and wherein a fifth set of target colour coordinate sets is formed in the second device independent colour space by mapping towards that second device independent colour space each of the colour coordinate sets of the third set, and wherein thereafter a target function expressed in the coefficients of the second matrix is each time determined for each of the target colour coordinate sets of the fifth set and each of the colour coordinate sets of the fourth set, which target function is thereafter minimised and a further second matrix is determined with the minimised target function. By minimising the target function expressed in coefficients of the second matrix, it is possible to determine the coefficients of the second matrix with more precision. The second colour separation determined with that second matrix is in that way also determined in a more precise manner.

Advantageously, the colour distance between the target colour coordinate set and the second colour coordinate set is determined and said target function is determined from that colour distance. The colour distance is a parameter which can be determined in a simple and reliable way. Thereupon, the colour distance offers a good basis to determine the target function.

A third preferred embodiment of a method according to the invention is characterised in that said minimisation comprises a minimisation of the Euclidean distance in a perceptual uniform colour space. The minimising of the colour distance can be realised in such perceptual uniform space in a reliable manner in order to thus reduce the visual differences.

A fourth preferred embodiment of a method according to the invention is characterised in that a second colour separation set is built by each time, after determination of a second colour separation after minimisation, storing the latter in a memory even as the deviation between the target colour coordinate set and the second colour coordinate set. A data base for the different printing inks is thus built up in such a manner that it is not necessary to determine each time the second matrix, as the minimisation, in order to determine a second colour separation which would already have been obtained in such a manner.

A fifth preferred embodiment of a method according to the invention is characterised in that if the dimension of the second device dependent colour space is larger than three, for the $b^{th}$ (b>3) colours, those colours are selected of which the value of the gradient norm of the second colour coordinate set expressed as a function of the second colour separation is the smallest, and wherein for the thus selected colours the second colour separation coefficient is chosen as target value and a further target function is determined from the target colour coordinate set, the second colour coordinate set and the target value, which further target function is thereafter minimised and a modified second colour separation being determined with the minimised further target function. The latter offers a solution for the ink choice within the second device dependent colour space having a dimension larger than three.

Advantageously, weight coefficients are attributed to the variables of said further target function. The mutual relative importance of the different variables which belong to the target function can thus be weighed.

Advantageously, by printing said picture, a further set of first colour separations of pixels belonging to said picture is determined, and for each first colour separation of said further set each time a still further set of second colour separations is determined by each time selecting the corresponding second colour separation and the deviation from each of the tables, and wherein thereafter for each set of non-standard inks an average value of the deviation is determined from each of the deviations of the element with the still further set, and among said average values the one with the lowest value is chosen and the set of non-standard inks belonging thereto is chosen, and thereafter for each first colour separation and the chosen set of non-standard inks the second colour separation is determined by means of the table. Herewith, an automatic ink selection is possible.

The invention also relates to a device for application of the described method. Such a device is characterised in that it comprises a conversion unit provided with conversion means for forming said second matrix and said second color separations from said first colour separation.

BRIEF DESCRIPTION OF THE DRAWINGS

The invention will now be further described by means of the attached drawings, in which.

DETAILED DESCRIPTION OF THE PREFERRED EMBODIMENTS

Figure 1:
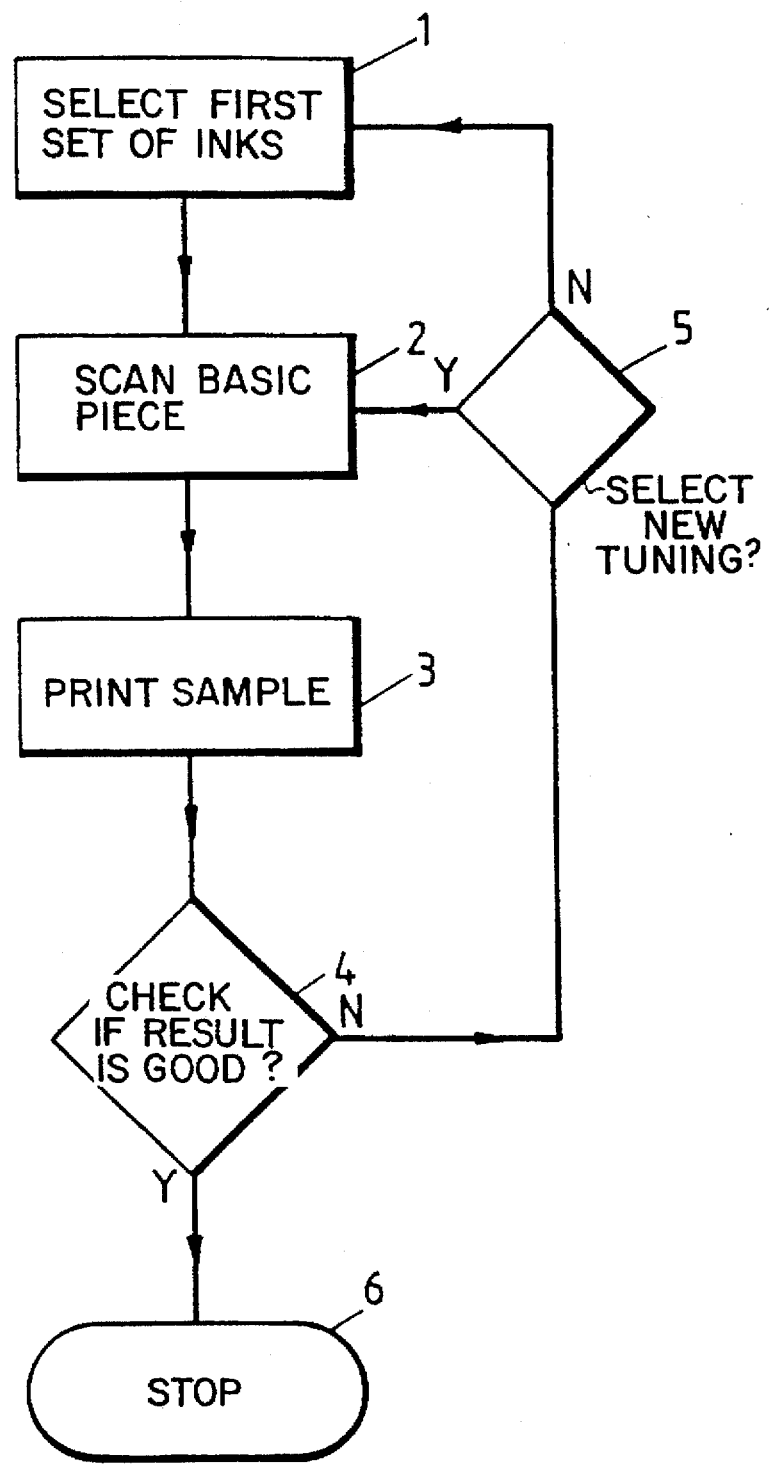
FIG. 1 shows a flow chart illustrating the known method.

In the known method of generation of printing data such as represented in FIG. 1 a first set of non-standard printing inks is chosen (1). Non-standard printing inks signify non-YMCK (yellow, magenta, cyan and black) or inks directly derived from them. So for example PANTONE (registered mark) red, process yellow and PANTONE brown form a set of non-standard inks that are used for printing packaging material for chocolate. The operator preparing and executing the printing process will give a preference to the use of such non-standard inks because they are more suitable to transfer an impression linked with that product, as well as to obtain certain effects.

The printing process starts out from a basic piece such as for example a picture formed by a colour picture or a colour design. The basic piece is scanned by a reproduction scanning device (2) which however has been tuned beforehand to generate each time for the pixels a colour separation defined in a device dependent colour space defined by the chosen printing ink set. The tuning of the scanning device depends largely on the amount of experience which the printer has acquired and which relies on a purely empirical basis.

Once a colour separation has been furnished by the scanning device, the printer will print a sample (3) and will look at the results (4). If the result is directly good, then the printer has a suitable colour separation and he possesses that printing data to execute the printing. The method will herewith also be finished (6). If not, then the printer has to select another tuning (5) for the scanning device and has to repeat the whole process described hereabove, which is time consuming and of poor efficiency. With such an empirical process the experience of the printer of course plays an important part.

The empirical character of the known method has its origin in the fact that the scanning device is used for a purpose for which it was not intended, in particular the production of a colour separation for non-standard inks. The known scanning device is developed to produce a standard YMCK colour separation. The optics, electronics, software, user interface, and colour correction of the scanning device have all been developed in such a manner as to generate a standard YMCK colour separation. The generation of a colour separation for non-standard colours by means of a known reproduction scanning device is possible due to the multiple colour correction possibilities such a device possesses, but is not an easy task because the device was not destined for that purpose. Thereupon the choice of a set of non-standard inks is subjective and shall only furnish a satisfying result after many attempts.

Figure 2:
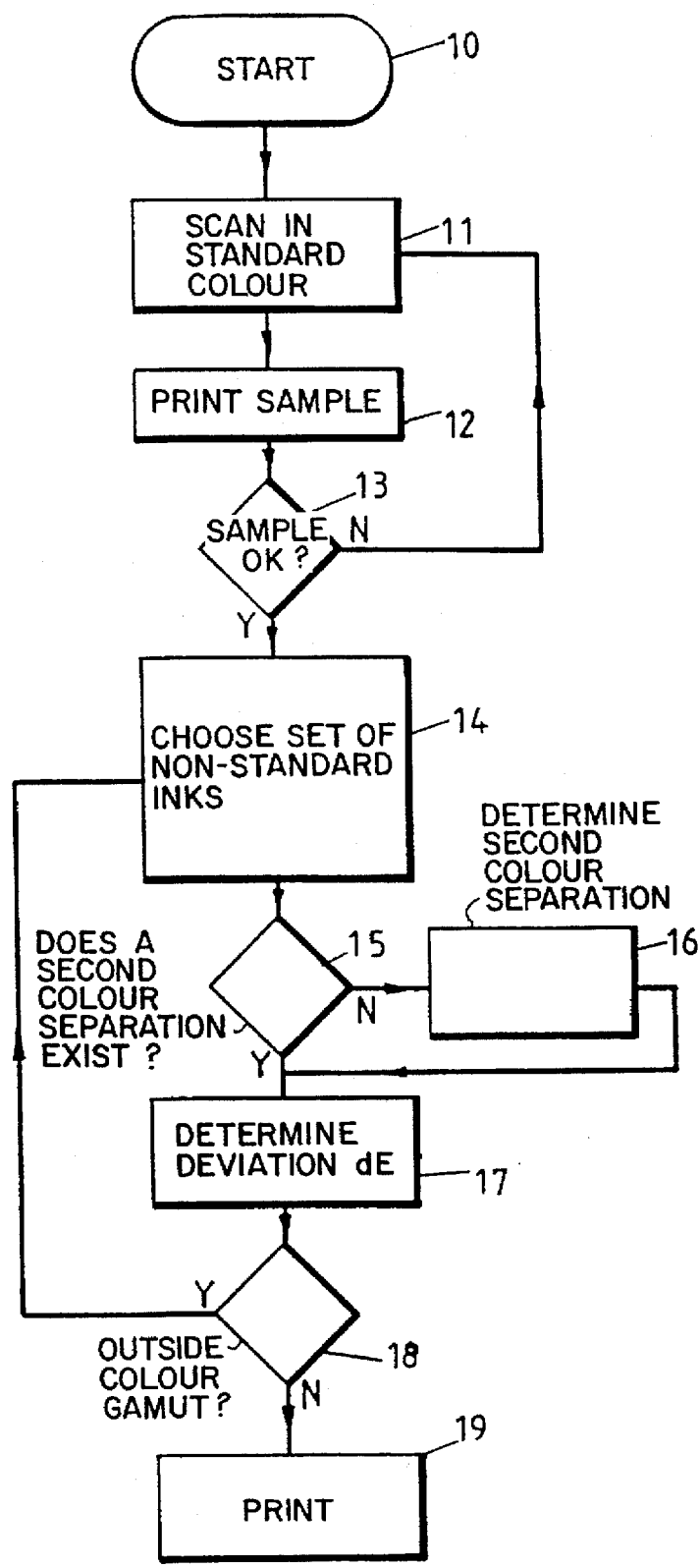
FIG. 2 shows a flow chart illustrating the method according to the invention.

Contrary to the known method, in the method according to the invention, a standard colour separation is used. The scanning device is now exactly used for the purpose for which it has been developed, namely the generation of a standard first colour separation such as for example a YMCK separation. The flow chart shown in FIG. 2 illustrates the method according to the invention. After starting (10) the reproduction scanning device, a first set formed by standard first colour separation (11) is generated from the scanned basic piece. If necessary, eventual colour corrections are applied in the first device dependent space, in the embodiment the YMCK colour space. Such a colour correction is a known manipulation.

Preferably the printer will make a sample with the known YMCK inks (12). Thus for example use is hereby made of a cathode ray tube monitor with standard YMCK testing facilities. Other alternatives are direct digital colour proof (DDCP) whereby a sample is made without using film, or film is used and thereafter a CROMALIN (registered trademark of Dupont de Nemours) or a MATCHPRINT (registered mark of 3M) is made. For the method according to the invention the production of such a sample print is not strictly necessary; however, it gives a good impression of the quality of the first colour separation. When the sample print does not provide a good result (13) a new set of first colour separations is determined and the sample print is repeated by making use of that new set.

The generation of a first colour separation of a first YMCK colour space is not the only possible solution within the method according to the invention. With an alternative embodiment an RGB (Red, Green, Blue) first colour separation is determined. For each type of basic material the relation between the colour coordinate, expressed in the device independent colour space of a uniform coloured sample of the basic piece, and the scanned RGB data will be different. In order to establish that relation a basic piece with a uniform coloured sample with known features in the device independent colour space defined colour coordinate set is scanned, for example with ANSI IT 8.7/1 or 7/2. That data is thereafter stored and used for transforming RGB data into coordinates in the first device independent space for ink selection and colour gamut verification, as an image conversion.

After determination of a first colour separation in a first device dependent colour space, a set of non-standard inks is chosen (14). That choice is made either by the operator himself or automatically by making use of a database, as will be described hereafter. When the choice is made by the operator himself, the latter will choose a set of printing inks, for example as a function of what is usable for the product to be printed. By automatic selection the device itself will select a set of inks which will produce the best colorimetric reproduction. The device thereby considers among others the limitation imposed by the printer himself such as, for example, the maximum number of printing inks for the product to be printed and the inks already used for printing text and lines.

After determination of the set of non-standard printing inks, it is verified (15) that for those non-standard printing inks which determine a second device dependent colour space, a second colour separation defined in that second device dependent colour space has been determined for the chosen printing inks, for example, during a preceeding procedure, and which are stored in a memory. When such a second colour separation has not been determined, then it will be determined for the chosen set of printing inks (16). The determination of such a second colour separation signifies the determination of a transformation giving the correspondence between each combination of a dot percentage of the non-standard inks and the colour coordinates in the device independent space of a colour patch printed with the given pixel percentage.

The problem arising with such a conversion, is that a contone pixel has to be transformed in such a manner that after transformation the same representation for the human eye is obtained. The pixel starts out having a first colour separation, expressed for example in terms of (c, m, y, k) coordinates defined in a first CMYK device dependent colour space. That first colour separation has then to be transformed into a second colour separation, expressed for example in terms of (t, q, r, s) coordinates, defined in a second device dependent colour space defined by the chosen non-standard printing inks. That transformation is for example realised by means of a colorimetric conversion in the device independent space correlated with the device dependent space by means of a predetermined mapping which fixes the relation between the device dependent colour space and the device independent colour space. Such a conversion is however highly non-linear and the inverted mapping is not easy to determine. Further, a correct solution can not exist when the colour from the first device dependent space does not belong to the colour gamut of the second device dependent space. Thereupon the solution will not be unequivocal when the set of non-standard printing inks comprises more than three inks because the device independent space is three dimensional.

A simple solution for that conversion is to form a matrix whereby on each row a single "1" is present and the remaining coefficients are "0". That matrix does not necessarily have to be a unity matrix. According to that solution the colour separation from the first colour space is taken over as such in the second colour space. Such a solution offers a first rough estimation which can be adjusted as will be described hereafter.

Another solution, which is designated as linear matrix method, comprises the determination of a matrix which is multiplied with the first colour separation in order to determine a second colour separation, $$\begin{pmatrix} t \\ q \\ r \\ s \end{pmatrix} = \begin{pmatrix} Mpc & Mpm & Mpy & Mpk \\ Mqc & Mqm & Mqy & Mqk \\ Mrc & Mrm & Mry & Mrk \\ Msc & Msm & Msy & Msk \end{pmatrix} \begin{pmatrix} c \\ m \\ y \\ k \end{pmatrix}$$

within that matrix the coefficient Mrm gives the contribution of the colour separation of the $m^{th}$ first printing ink to the $r^{th}$ second printing ink. The determination of those matrix coefficients will be described in detail hereunder.

Besides the linear matrix method it is also possible to use a non-linear matrix method. The latter has the advantage that higher order terms are taken into account, such as secondary and tertiary terms in the colour separation. Here it starts from a relative colour separation which is determined from the first colour separation by means of a reproduction scanning device. A first set of relative colour separations comprises for example seven colour separations and is determined from a (c, m, y, k) colour separation.

cnl=max(c−max(m,y), 0)

mnl=max(m−max(c,y), 0)

ynl=max(y−max(c,m), 0)

rnl=max(min(m,y)−c,0)

gnl=max(min(c,y)−m,0)

bnl=max(min(c,m)−y,0)

knl=min(c,m,y)+k

Another example to determine a set of even relative colour separations is:

cnl=c−gnl−bnl−c*m*y mnl=m−rnl−bnl−c*m*y ynl=y−rnl−gnl−c*m*y rnl=m*y−c*m*y gnl=c*y−c*m*y bnl=c*m−c*m*y knl=c*m*y+k Also for these relative colour separations a matrix is determined in order to transform a first relative colour separation into a second colour separation expressed in coordinates of the second device dependent colour space.

$$\begin{pmatrix} t \\ q \\ r \\ s \end{pmatrix} = \begin{pmatrix} Mp1 & Mp2 & Mp3 & Mp4 & Mp5 & Mp6 & Mp7 \\ Mq1 & Mq2 & Mq3 & Mq4 & Mq5 & Mq6 & Mq7 \\ Mr1 & Mr2 & Mr3 & Mr4 & Mr5 & Mr6 & Mr7 \\ Ms1 & Ms2 & Ms3 & Ms4 & Ms5 & Ms6 & Ms7 \end{pmatrix} \begin{pmatrix} cnl \\ mnl \\ ynl \\ rnl \\ gnl \\ bnl \\ knl \end{pmatrix}$$

In this matrix the indices 1 to 7 refer to the order of the colour separation in the first relative colour separation.

The determination of the matrix coefficients will now, for the sake of clarity, be described by means of an example. Suppose that a (c, m, y, k) colour separation has been determined as a first colour separation. Assume furthermore that as printing inks the inks PANTONE red 485(r), process yellow (y) and PANTONE brown 497(b) have been selected. The three by four matrix to be formed has now the following configuration:

$$\begin{pmatrix} Mrc & Mrm & Mry & Mrk \\ Myc & Mym & Myy & Myk \\ Mbc & Mbm & Mby & Mbk \end{pmatrix}$$

Once the printing inks to be used have been selected, the second device dependent colour space defined by those printing inks is fixed. A set of p (p≥n) different colours is chosen within the colour gamut of that second device dependent colour space, which colours have at least a predetermined distance with respect to each other. That predetermined colour distance comprises for example 10 ΔE, whereby ΔE represents the Euclidean distance expressed in coordinates of the Cie Lab space. By choosing the colours on a predetermined distance from each other, the result is that the chosen colours from the set are spread in a certain manner over the colour space.

Within the chosen embodiment the set of colours comprises p=4 colours. However, when use is made of relative first colour separations, such as given here before, that set comprises p=7 colours. The chosen colours from the set will be indicated as colour 1, 2, 3 and 4.

Starting from the chosen colour set a first colour table is now set up which mentions the colour coordinates for each colour from that chosen set in percentages of the coordinates of the colour space, in which the first colour separation is defined likewise. The first colour table has then in the chosen example the following content.

|   | Colour | | | |
|---|---|---|---|---|
|   | 1 | 2 | 3 | 4 |
| c | 0 | 6 | 92 | 54 |
| m | 89 | 8 | 98 | 97 |
| y | 90 | 100 | 100 | 100 |
| k | 0 | 0 | 1 | 68 |

In the chosen example the colour 1 comprises thus 0% cyan, 89% magenta, 90% yellow and 0% black. Those percentages are for example derived from tables known by themselves which have been published by PANTONE, or could be derived by means of interpolation between measured values.

A second table is also set up which for each of the colours from the set represents the colour coordinates in the second device dependent colour space, in the example in the three dimensional space defined by the selected printing inks. The second colour table has then in the chosen example the following content:

|   | Colour | | | |
|---|---|---|---|---|
|   | 1 | 2 | 3 | 4 |
| Pms 485 | 100 | 0 | 0 | 100 |
| py | 0 | 100 | 0 | 100 |
| Pms 497 | 0 | 0 | 100 | 100 |

In the chosen example the colour 4 comprises 100% of each of the chosen printing inks.

After having set up the first and second table a first p by p matrix is formed on the basis of the first table whereby for the $P_{ij}^{th}$ (1≤i≤p; 1≤j≤p) matrix coefficient the $j^{th}$ colour coordinate of the $i^{th}$ colour is taken such as represented in the first table. In the chosen example that first matrix has the following content:

$$(P_{ij}) = \begin{pmatrix} 0 & 89 & 90 & 0 \\ 6 & 9 & 100 & 0 \\ 92 & 98 & 100 & 1 \\ 54 & 97 & 100 & 68 \end{pmatrix}$$

An inverse matrix $(P_{ij})^{-1}$ is now determined for that first matrix $(P_{ij})$ in order to determine the coefficient (M) of the second matrix giving the transformation between the first and the second colour separation. Those second matrix coefficients are then determined as follows:

$$\begin{pmatrix} Mrc \\ Mrm \\ Mry \\ Mrk \end{pmatrix} = (P_{ij})^{-1} \begin{pmatrix} 100 \\ 0 \\ 0 \\ 100 \end{pmatrix}$$

$$\begin{pmatrix} Myc \\ Mym \\ Myy \\ Myk \end{pmatrix} = (P_{ij})^{-1} \begin{pmatrix} 0 \\ 100 \\ 0 \\ 100 \end{pmatrix}$$

$$\begin{pmatrix} Mbc \\ Mbm \\ Mby \\ Mbk \end{pmatrix} = (P_{ij})^{-1} \begin{pmatrix} 0 \\ 0 \\ 100 \\ 100 \end{pmatrix}$$

The third matrices $$\begin{pmatrix} 100 \\ 0 \\ 0 \\ 100 \end{pmatrix}$$

$$\begin{pmatrix} 0 \\ 100 \\ 0 \\ 100 \end{pmatrix}$$

and $$\begin{pmatrix} 0 \\ 0 \\ 100 \\ 100 \end{pmatrix}$$

are obtained by taking from the second table the first, second and third colour separations from the colour set. In this manner one obtains the second matrix which is a p by m matrix (m=3 in the chosen example), which for the chosen example has the following contents.

$$(M) = \begin{pmatrix} -1.20 & 1.14 & -0.02 & 0.83 \\ -1.03 & -1.10 & 1.09 & 1.46 \\ 1.08 & 0.07 & -0.07 & 0.61 \end{pmatrix}$$

The second colour separation is now obtained by:

$$\begin{pmatrix} t(pms\,485) \\ q(y) \\ z(pms\,497) \end{pmatrix} = (M) \begin{pmatrix} c \\ m \\ y \\ k \end{pmatrix}$$

By making use in the described manner of the first colour separation to determine the second colour separation a reliable initial value is obtained for that second colour separation, which is started from a reliable first colour separation. That initial value already offers a usable colour separation for printing with non-standard inks.

The initial value of the second colour separation can however still be further adjusted by application of a multi-dimensional minimisation. The principle of such a minimisation is known as such and is for example described in "Numerical Recipes in C, the Art of Scientific Computing" of W. H. Press, B. P. Flannery, S. A. Teukolsky en W. T. Vetterling, 1988 Cambridge University Press p.305–309.

With this description, there will only be described in detail the application of such a minimisation with respect to the colour separation such as obtained by application of the method according to the invention.

Experience has taught that a direct minimisation leads to discontinuities in the colour separation, i.e. to colours which for the human eye seem close to each other, but when they are printed lead to a totally different pixel percentage of the ink. With a picture having a smooth colour transition this leads to so called banding structure in the separation films. Those bandings are created because no perfect minimisation method exists for multidimensional non-linear problems which leads to a global minimum in a finite time space. The methods are limited to the determination of a local minimum in the neighbourhood of the initial value. However with non-linear target functions there are several such local minima's. Finding a reliable initial value is thus important in order to avoid that minimisation takes place on different local minima's. An important advantage of the method according to the invention arises at this stage because it leads to a reliable initial value. Indeed, by making use of the first colour separation the second colour separation is determined in a coherent manner and based on a well defined colour separation.

Figure 3:
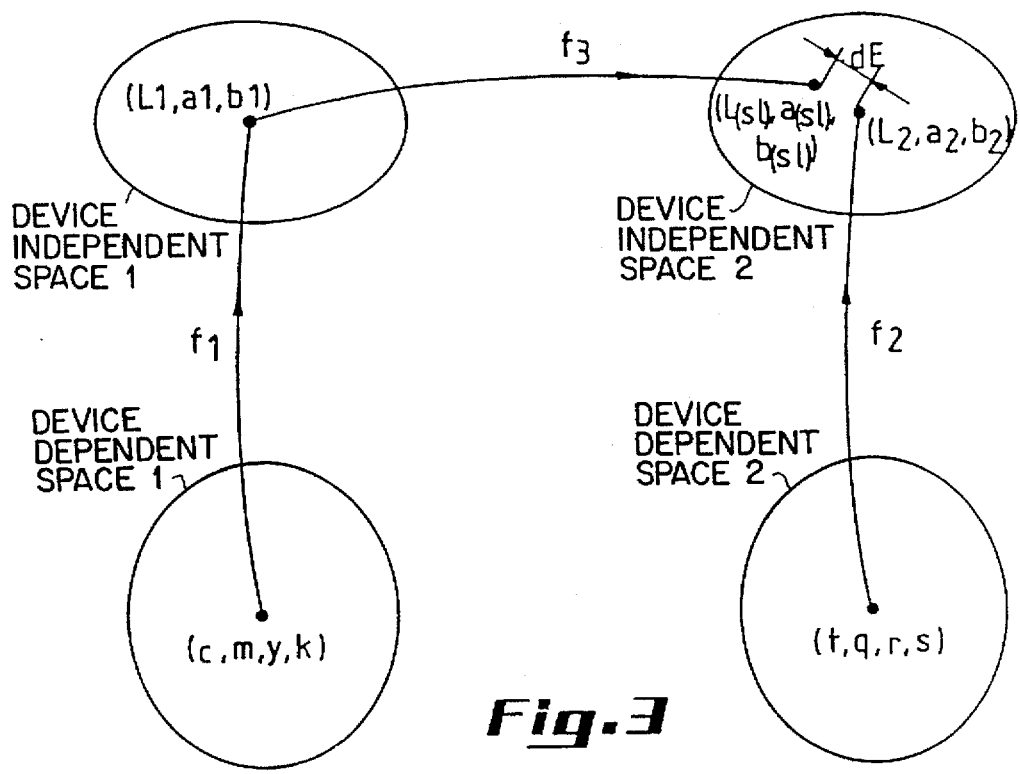
FIG. 3 illustrates schematically the transformation into the device independent colour space even as the determination of a target colour coordinate set.

That same first colour separation (c, m, y, k) will also play an important part in the minimisation. The first and second colour separations are respectively defined in a first and a second device dependent space, such as schematically represented in FIG. 3. By making use of a mapping f1 establishing the relation between the first device dependent colour space and a first device independent colour space corresponding therewith, for example a Cie Lab (1) space, a mapping is realised from the first colour separation towards the first device independent colour space. Doing so, in that first device independent space a first colour coordinate set (L1, a1, b1) is determined. With the second device dependent colour space a second device independent colour space is also correlated, for example a Cie Lab (2). The second colour separation (t, q, r, s) is now mapped by means of a function f2 towards the second device independent colour space in order to form there a second colour coordinate set (L2, a2, b2). The first colour coordinate set is now mapped by means of a function f3 to the second device independent colour space in order to determine there a target colour coordinate set [L(s1), a(s1), b(s1)].

That target colour coordinate set and the second colour coordinate set in the second device independent colour space now form two points in that latter colour space between which the colour distance or Euclidean distance dE is determined.

$$dE = \sqrt{(L(s1) - L2)^2 + (a(s1) - a2)^2 + (b(s1) - b2)^2}$$

A target function g is now determined from that colour distance for example by:

g(t, q, r, s)=dE.

The determination of the target function from the colour distance is one possible solution but not the sole solution. The target function is determined from the target colour coordinates set [L(s1), a(s1), b(s1)] and the second colour coordinates set (L2, a2, b2) by means of a mathematical relation which in principle can be arbitrarily fixed. The target function is expressed in terms of the second colour separation, which signifies that the target function is derived from the second colour coordinate set (L2, a2, b2) which in their turn originate from the second colour separation (t, q, r, s).

After determination of the target function, the latter is minimised in order to obtain a further second colour separation (t', q', r', s') which will substitute the second colour separation.

By minimising the target function the importance of a reliable initial guessing of the second colour separation appears because, as already described, the minimisation method is limited to a local minimum in the neighbourhood of the initial value. By starting from a reliable initial value (t, q, r, s) for the second colour separation, determined via a second matrix as described here before, the function is minimised around a same local minimum.

The minimisation of the target function can be realised starting from a target function determined from a colour separation such as described just hereabove. The target function can however also be expressed in coefficients of the second matrix. Therefore it is necessary to take not only a first and second colour separation but a first and second set of first $(c_j, m_j, y_j, k_j)$ $(0 \leq j \leq N)$ and second $(t_j, q_j, r_j, s_j)$ colour separations. In the first (DVD1) and second (DVD2) device dependent colour spaces a set of each time N colours separation is thus taken. Each $j^{th}$ colour separation $(t_j, q_j, r_j, s_j)$ is determined from the $j^{th}$ colour separation $(c_j, m_j, y_j, k_j)$ by making use of the second matrix M. In an analogous manner as described by the embodiment represented in FIG. 3, a first and second colour coordinate set [(L1$_j$, a1$_j$, b1$_j$) and (L2$_j$, a2$_j$, b2$_j$), respectively] is determined for each first and second colour separation by means of a respective mapping f1 and f2 towards the first and the second device independent colour spaces. In this manner a third and fourth set of first and second colour coordinates set is respectively determined. Further there is determined a fifth set of N target colour coordinate sets (L(s1)$_j$, a(s1)$_j$, b(s1)$_j$) determined for each $j^{th}$ first colour coordinates set from the third set by means of a mapping f3 towards the second device independent colour space (DVI2).

In the second device independent space the fourth and fifth set are now fixed and a target function g' can now be determined from the target colour coordinate sets and the second colour coordinate sets. The target function is now expressed in coefficients of the second matrix because each second colour coordinate set originated by mapping of a second colour separation is obtained by means of the second matrix. The colour distance is for example now again determined to determine the target function.

$$dE_j = \sqrt{(L(s1)_j - L_{2j})^2 + (a(s1)_j - a_{2j})^2 + (b(s1)_j - b_{2j})^2}$$

In such a manner that the target function for example becomes:

$$g'(M(rc), M(rm), \ldots, M(bk)) = \frac{1}{N} \sum_{j=1}^{N} dE_j$$

The target function g' is thereafter minimised and from there is determined a further second matrix M' which substitutes the second matrix M. A further second colour separation (t', q', r', s') is now again determined with that further second matrix by:

$$\begin{pmatrix} t' \\ q' \\ r' \\ s' \end{pmatrix} = (M') \begin{pmatrix} c \\ m \\ y \\ k \end{pmatrix}$$

The thus obtained further second colour separation (t', q', r', s') substitutes then the second colour separation (t, q, r, s). The further second colour separation can now be used on its own to determine, by means of the mapping f2, a further second colour coordinate set in the second device independent colour space. A further second colour coordinate set (L'$_2$, a'$_2$, b'$_2$) is thus formed in the second device independent colour space. Again a target function is formed, $$dE(t',q',r',s') = \sqrt{(L(s1) - L_2')^2 + (a(s1) - a_2')^2 + (b(s1) - b_2')^2}$$

which each time is minimised. The target function is expressed in the further second colour separation. With the minimised target function a still further second colour separation (t", q", r", s") is then each time determined which substitutes the further colour separation. A high level of accuracy is thus obtained for the second colour separation.

When the second colour separation for the selected non-standard printing inks is determined, preferably after minimisation, the latter is stored in a memory. Also the colour distance dE between the target colour coordinate set and the second colour coordinate set belonging to that second colour separation is stored in a memory. That colour distance namely gives a good indication of the visual distortion between the first and the second colour separation. This enables not to have to determine each time the latter colour separation again, when a non-standard printing ink is chosen for which the second colour separation has already been determined. The second colour separation as the known dE value can then be fetched from the memory. Preferably the second colour separations are stored in such a manner that a correlation is present between the first and the second colour separation, for example by means of a conversion table which converts a first colour separation into a memory address at which the known second colour separation is stored.

The colour distance dE is used to enable an automatic ink selection. For a given picture to be converted it is now possible to determine for each point in that picture the conversion error. This signifies that information is generated which indicates how accurately the picture colour representation will be and how much the deviation will be for each colour.

Preferably, each time a table is stored in the memory for the different sets of non-standard printing inks. In that table the second colour separations corresponding with those first colour separations and the deviation dE belonging thereto are stored.

When use is made of a memory wherein the second colour separation and the known deviation dE are stored, then in practice the method will be performed in the following manner. A number of X points in the original picture is scanned for which each time the first colour separation is determined in order to thus obtain a further set of first colour separations. Each of those first colour separations is then used to read from the memory and to fetch the corresponding second colour separation with known deviation dE. When in the memory Z tables of the different non-standard printing inks are stored, then for each $x^{th}$ ($1 \leq x \leq X$) colour separation, each time a still further set of second separation is formed by each time selecting from each table the corresponding second colour separation and the known deviation dE. Thereafter for each set of non-standard inks an average value of the deviation is determined.

$$\overline{dE_Z} = \frac{1}{X} \sum_{x=1}^{X} dE_X$$

That set of non-standard inks which provides the smallest $\overline{dE_z}$, is now chosen as a set of non-standard printing inks for the picture to be printed. Once the set has been selected the second colour separation for that selected set is determined for each first colour separation of the basic piece.

The function f2 mapping a second colour separation of the device dependent colour space DVD2 towards the second device independent colour space defines a domain in that second device independent colour space which is called the colour gamut.

The deviation dE also gives an indication whether the target colour coordinate set is within or outside the colour gamut. Coming back to the flow chart of FIG. 2 that deviation dE is determined under step 17, or fetched if use is made of a memory and predetermined values. Thereafter there is inspected (step 18) if the target colour coordinate set is situated outside the colour gamut of the second device dependent colour space. That step 18 is preferably executed for a number of samples within the picture to be represented. When the target colour coordinate set is situated outside the second colour gamut (18, Y) then the steps 14 to 18 are repeated with a new choice of non-standard inks. When no colour gamut problems arise, the conversion towards non-standard printing inks and the printing step 19 can take place.

By determining the target colour coordinate set it is possible to execute pitch and colour corrections in the visually uniform colour space. Also the manipulation of the saturation under constant hue can be executed in that second device independent colour space. White point adaptation is also possible.

With the described embodiment use is made of three non-standard printing inks. In the embodiment the dimension p of the second device independent space (namely p=3) is the same as the one of the second device dependent colour space. However a problem arises when the dimension p of the second device dependent space is larger than three, for example when four or more non-standard printing inks are used. A general solution to such a problem is for example described in the European patent application (EPA) n° 0501942. With that solution a value is determined for each dimension larger than p.

The method according to the invention differs in two aspects from the one described in EPA 0501942. The specific implementation of this solution within the method according to the present invention will now be described by means of a preferred embodiment wherein four non-standard printing inks are used.

A first difference between EPA 0501942 and the present method is in the choice of the remaining colours, in this example the fourth colour. Instead of choosing one colour which has a lot of influence on the remaining colours, but only gives a density modulation, a colour is chosen which has less influence on the other ones. With the method according to the present invention a colour is chosen, i.e. a printing ink, whose gradient norm of the second colour coordinate set expressed as a function of the second colour separation, is the smallest. Gradients are now determined as given hereunder for a set of four non-standard printing inks (t, q, r, s)

$$\left(\frac{\delta L}{\delta t}, \frac{\delta a}{\delta t}, \frac{\delta b}{\delta t}\right), \left(\frac{\delta L}{\delta q}, \frac{\delta a}{\delta q}, \frac{\delta b}{\delta q}\right),$$

$$\left(\frac{\delta L}{\delta r}, \frac{\delta a}{\delta r}, \frac{\delta b}{\delta r}\right) \text{ and } \left(\frac{\delta L}{\delta s}, \frac{\delta a}{\delta s}, \frac{\delta b}{\delta s}\right)$$

For each colour the gradient norm is now determined $$\left\|\frac{\delta L}{\delta t}, \frac{\delta a}{\delta t}, \frac{\delta b}{\delta t}\right\|, \left\|\frac{\delta L}{\delta q}, \frac{\delta a}{\delta q}, \frac{\delta b}{\delta q}\right\|,$$

$$\left\|\frac{\delta L}{\delta r}, \frac{\delta a}{\delta r}, \frac{\delta b}{\delta r}\right\| \text{ and } \left\|\frac{\delta L}{\delta s}, \frac{\delta a}{\delta s}, \frac{\delta b}{\delta s}\right\|$$

From this the smallest norm is chosen. Assuming that $$\left\|\frac{\delta L}{\delta s}, \frac{\delta a}{\delta s}, \frac{\delta b}{\delta s}\right\|$$

is the smallest value, then the colour s is chosen as fourth colour.

An initial value for the second colour separation $(t_i, q_i, r_i, s_i)$ is now determined by means of the already described matrix method starting from the first colour separation (c, m, y, k). First and second colour separations now furnish first and second (L, C, H) colour coordinate sets. A target colour coordinate set $(L_t, C_t, M_t)$ is now obtained by mapping the first colour coordinate set towards the second device dependent colour space. In that set L represents the luminescence, C the chroma and H the hue.

The gradient having the smallest norm was the one belonging to the colour s. The value $s_t(s_{i=st})$ is selected as the fourth colour. By means of the minimisation the combination (t, q, r) will be searched in such a manner that (t, q, r, st) provides the exact colour. For the minimisation the target function g is used:

$$g(t_i, q_i, r_i, s_i) = \sqrt{\alpha \Delta L^2 - \beta \Delta C^2 - \gamma \Delta H^2 - \tau(s-st)^2}$$

wherein $\alpha$, $\beta$ and $\gamma$ are weight coefficients for the luminescence, the chroma and the hue.

$$\Delta L = L - L_t$$

$$\Delta C = C - C_t$$

$$\Delta H = H - H_t$$

t is the coefficient representing the relative importance of the deviation between the fourth variable s and its target value st.

The target function g is no longer the Euclidean distance by the presence of the fourth variable $(s-s_t)$ defined in the second device dependent colour space. Due to this, the value s will shift towards $s_t$ due to the minimisation and t, q, and r will shift towards a value belonging to $s_t$. By selecting the colour with the smallest gradient norm, a small error in the target value $s_t$ will not induce a large variation in the remaining colour separations. If (t, q, r, s) and (t+dt, q+dq, r+dr, s+ds) provide substantially the same colour, then

|dt|<<|ds|, |dq|<<|ds|, and |dr|<<|ds|

By application of that method a continuous relation is imposed to the printing inks so as to assure that the dot percentages of the inks lead to a comparable representation of the picture.

Figure 4:
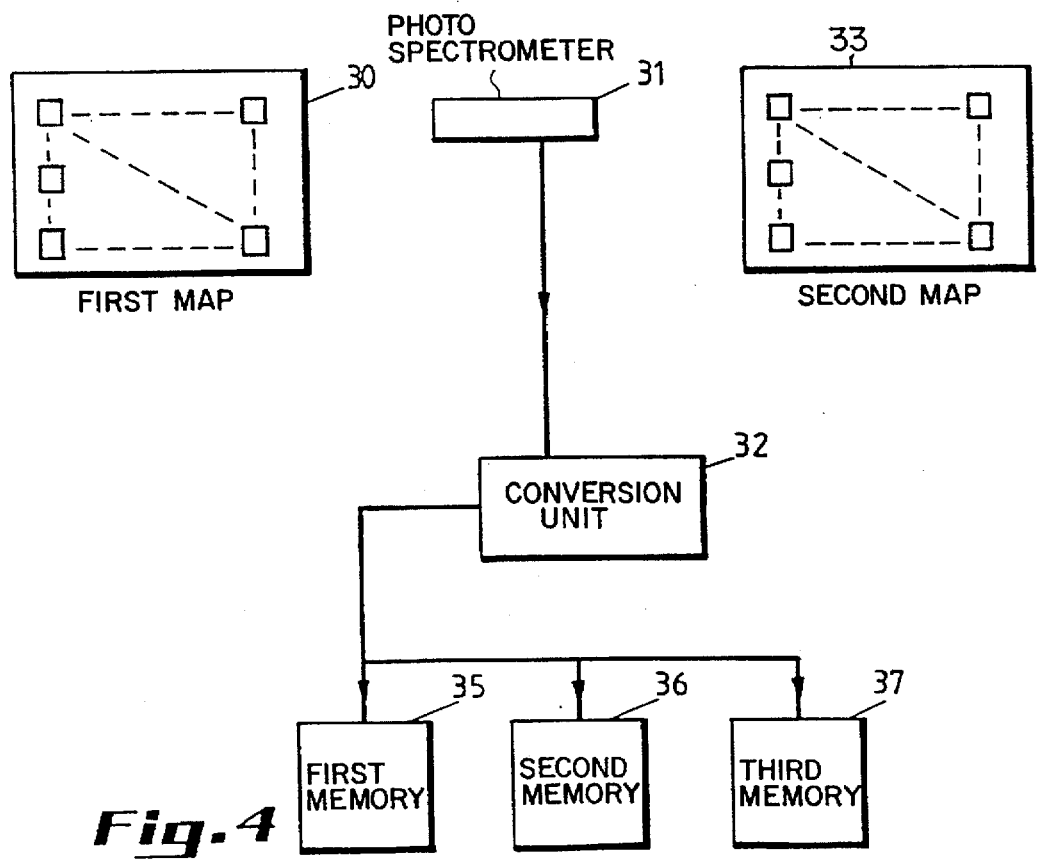
FIGS. 4 and 5, respectively show a bloc scheme of a first and second embodiment of a device according to the invention.

FIG. 4 illustrates an embodiment of a device for executing the method according to the invention. A photospectrometer 31 is used to determine starting from a first map 30, with each time colour representation of non-standard inks, the colour coordinates ($L_2$, $a_2$, $b_2$) in the second device independent colour space for each time a given second colour separation (t, q, r, s). From a second chart 33 with colour representations of standard inks, for example in (c, m, y, k) colour coordinates, ($L_1$, $a_1$, $b_1$) are determined by means of the photospectrometer for each time a given colour separation in terms of (c, m, y, k). The photospectrometer 31 is connected with a conversion unit 32, for example formed by a data processing unit provided with a memory which stores the necessary data to determine the matrix conversion M as described hereabove. Because the first as well as the second colour separation from the first and second charts are known, and the first and second colour coordinate sets have been measured, the functions f1 and f2 can be unequivocally determined. The second matrix is then determined in the manner described hereabove. Conversion tables (LUT Look Up Table) can also be determined wherein for a set of first colour separations each time the second colour separation corresponding therewith is stored. The deviation dE is also determined by the conversion unit in order to be stored. The conversion unit is connected with a first 35, second 36, and third 37 memory wherein (c, m, y, k)→(t, q, r, s) conversion matrices or the tables respectively containing (t, q, r, s)→(r, g, b) and the deviation dE for a (c, m, y, k)→(t, q, r, s) conversion are stored.

Figure 5:
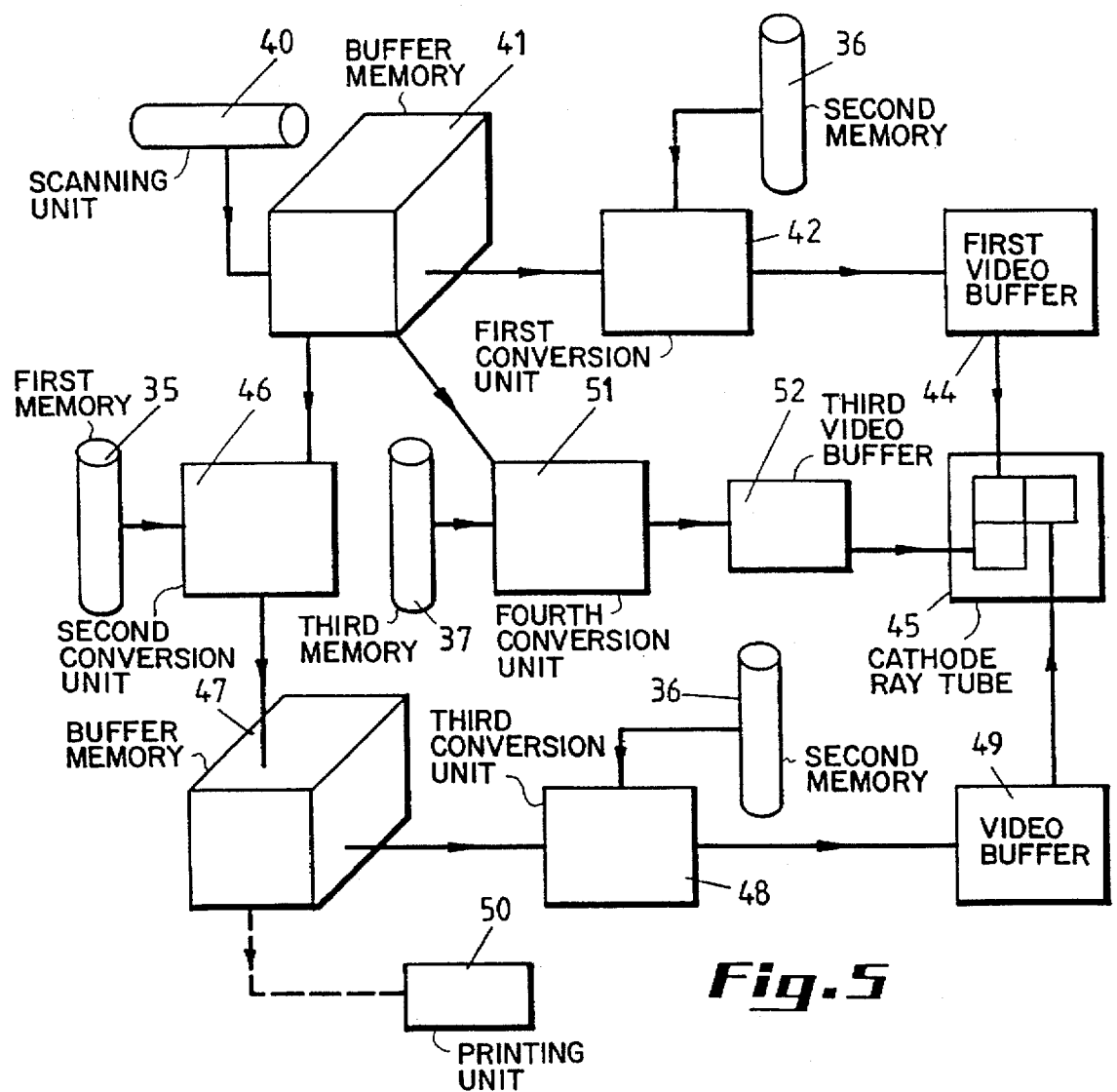

FIG. 5 shows an embodiment of the remaining part of the device for performing the method according to the invention. By means of a reproduction scanning unit 40 the basic piece is scanned in order to determine each time from a number of samples of the basic piece a first colour separation (c, m, y, k) and thus to form a first set of the first colour separation. The first colour separations are stored in a buffer memory 41. The buffer memory 41 is connected with a first conversion unit 42, an input of which is connected with the second memory 36. The conversion unit 42 is in turn connected with an input of a first video buffer 44, an output of which is connected with a cathode ray tube monitor 45. In this manner the scanned basic piece can be converted into R.G.B. data and represented on the monitor 45.

The monitor is preferably provided to represent the information windowwise, enabling an easy comparison between the different representations and a more clear representation of the characters.

The buffer memory 41 is further connected with a second conversion unit 46, an input of which is connected with the first memory 35. The second conversion unit is for example formed by a data processing unit (a microprocessor) equipped with a local memory and provided to determine the second colour coordinate set by means of the second matrix furnished by the first memory 35. By using the conversion tables the second conversion unit is equipped to provide interpolations between the stored colour separations. The thus formed second colour separation (t, q, r, s) is supplied to a further buffer memory 47. A data output of the further buffer memory 47 is connected with a first input of a third conversion unit 48 of which a second input is connected to a second memory 36. The third conversion unit converts the second colour separation towards R.G.B. data destined to a video buffer 49 that is connected with the monitor 45. This enables to also represent the picture with the second colour separation in a window of the monitor. The further buffer memory 47 is further connectable with a printing unit 50, provided for printing the printing data with a second colour separation.

The buffer memory 41 is finally also connected with a third conversion unit 51, an input of which is connected with the third memory 37 for receiving the deviation dE. The third conversion unit is analogous to the second conversion unit 46. An output of the fourth conversion unit is connected with a third video buffer 52 which in turn is connected with the monitor 45 for representation of the deviation in a third window.

In the embodiment according to FIG. 5 there are three video buffers 44, 49, and 52, but it will be clear that a single video buffer can also be used.

We claim:

1. A method for generating printing data for a picture to be printed, said picture being comprised of pixels, said method comprising:

defining a first n-dimensional device dependent colour space in which colour contributions expressed in terms of coordinates in said first colour space correspond to those of n colours of standard printing inks;

determining within said first colour space a first colour coordinate for each of said pixels of said picture;

defining a second m-dimensional device dependent colour space in which colour contributions expressed in terms of coordinates in said second colour space correspond to those of m colours of non-standard printing inks, said second colour space having a colour gamut;

selecting a set of p (p≧n) different colours among said colour gamut of said second colour space, each of said p colours being separated by at least a predetermined colour distance from each other;

determining a first colour table representing, for each colour of said selected set of p different colours, colour contributions expressed in terms of coordinates in said first colour space;

determining a second colour table representing, for each colour of said selected set of p different colours, colour contributions expressed in terms of coordinates in said second colour space;

forming a first p by p matrix having as a $p_{ij}^{th}$ (1≦i≦p; 1≦j≦p) matrix coefficient a $j^{th}$ colour coordinate of an $i^{th}$ colour within said first table;

forming a second m by p matrix by first inverting said first matrix and by forming m third p by 1 matrices, each of said third matrices having as coefficients a respective $q^{th}$ (1≦q≦m) one of said colour coordinates in said second colour space of each of said colours belonging to said selected set of p different colours, said second matrix having as $q_{th}$ (1≦q≦m) row coefficients the transposed result of multiplying said inverted first matrix with a respective one of said third matrices; and determining a second colour coordinate within said second colour space for each of said pixels of said picture by multiplying said second matrix by said first colour coordinate.

2. A method as claimed in claim 1, further comprising, for each of said pixels of said picture:

transforming said first colour coordinate into a first mapped colour coordinate by means of a first predetermined mapping fixing a predetermined relation between said first device dependent colour space and a first device independent colour space;

transforming said second colour coordinate into a second mapped colour coordinate by means of a second predetermined mapping fixing a predetermined relation between said second device dependent colour space and a second device independent colour space;

forming in said second device independent colour space a target colour coordinate by mapping said first mapped colour coordinate towards said second device independent colour space;

determining a target function with respect to a difference between said target colour coordinate and said second mapped colour coordinate;

minimizing said target function in order to obtain an adjusted second colour coordinate by transforming said second colour coordinate with said minimised target function; and substituting said adjusted second colour coordinate for said second colour coordinate.

3. A method as claimed in claim 1, further comprising:

forming for said picture to be printed, a first set of first colour coordinates in said first device dependent colour space;

forming a second set of second colour coordinates in said second device dependent colour space by multiplying each of said first colour coordinates from said first set with said second matrix;

forming a third set of first mapped colour coordinates by transforming each of said first colour coordinates from said first set to a corresponding first mapped colour coordinate by means of a first predetermined mapping establishing a predetermined relation between said first device dependent colour space and said first device independent colour space;

forming a fourth set of second mapped colour coordinates by transforming each of said second colour coordinates from said second set to a corresponding second mapped colour coordinate by means of a second predetermined mapping establishing a predetermined relation between said second device dependent colour space and said second device independent colour space;

forming a fifth set of target colour coordinates in said second device independent colour space by mapping towards said second device independent colour space each of said first mapped colour coordinates of said third set;

determining a first target function expressed in terms of coefficients of said second matrix with respect to an average of a difference between each of said target colour coordinates of said fifth set and a corresponding second mapped colour coordinate of said fourth set, said target function being thereafter minimised in order to obtain an adjusted second matrix.

4. A method as claimed in claim 3, further comprising:

determining a sixth set of adjusted second colour coordinates by means of a matrix multiplication of said adjusted second matrix and each of said first colour coordinates of said first set;

mapping each of said adjusted second colour coordinates of said sixth set towards said second device independent colour space by means of said second predetermined mapping in order to form there a seventh set of adjusted second mapped colour coordinates;

determining a second target function expressed in terms of said adjusted second colour coordinates with respect to a difference between each of said target colour coordinates of said fifth set and a corresponding adjusted second mapped colour coordinate of said seventh set, said target function being thereafter minimised in order to obtain an eighth set of further adjusted second colour coordinates with said minimised second target function;

substituting said sixth set of adjusted second colour coordinates by said eighth set of further adjusted second colour coordinates.

5. A method as claimed in one of the claims 2, 3, or 4, wherein said difference between said target colour coordinates and said second colour coordinates is determined as a colour distance and wherein said target function is determined from that colour distance.

6. A method as claimed in claim 2, 3 or 4, wherein said minimisation of said target function comprises a minimisation of an Euclidean distance in a predetermined perceptual uniform colour space.

7. A method as claimed in claim 2 wherein, if said dimension m of said second device dependent colour space is larger than three:

said step of selecting said set of p different colours further includes, for the $b^{th}$ (b>3) colours, selecting those non-standard ink colours whose values of a gradient norm of said second mapped colour coordinates, expressed as a function of said second colour coordinates, are the smallest relative to all m non-standard ink colours, and wherein said step of determining said target function includes, for the thus selected $b^{th}$ colours, determining for the corresponding second colour coordinate coefficient a target separation value, said target function being expressed in terms of said second colour coordinates and indicating an accumulation of a deviation between said target colour coordinate and said second mapped colour coordinate in said second device independent colour space, said target function also giving an error between said target separation value and said second colour coordinate.

8. A method as claimed in claim 7, wherein weight coefficients are attributed to variables of said further target function.

9. A method as claimed in claim 2, further comprising:

storing in a memory said second colour coordinate and said difference obtained during said minimisation between said target colour coordinate said second mapped colour coordinate.

10. A method as claimed in claim 9, wherein tables are stored in said memory, a corresponding set of non-standard printing inks being associated to each table, said method further comprising:

storing said second colour coordinate corresponding to said first colour coordinate of said set of m non-standard printing inks in a corresponding table, as obtained by minimising said difference between target colour coordinate and second mapped colour coordinate.

11. A method as claimed in claim 10, further comprising:

determining a set of first colour coordinates for each of said pixels belonging to said picture and determining for said set of first colour coordinates a corresponding set of second colour coordinates by selecting for each of said first colour coordinates a corresponding second colour coordinate and a corresponding difference from a corresponding one of said tables, and determining, for each set of non-standard inks, an average value of said difference among all differences stored in said set, and among said average values the one with the lowest value is chosen and a corresponding set of non-standard inks belonging thereto is chosen, and thereafter for each first colour coordinate and said chosen set of non-standard inks, said second colour coordinate is determined by means of a table corresponding to said chosen set of non-standard inks.

12. A device for generating printing data for a picture to be printed, said picture being comprised of pixels, said device comprising:

means for defining a first n-dimensional device dependent colour space in which colour contributions expressed in terms of coordinates in said first colour space correspond to those of n colours of standard printing inks;

means for determining within said first colour space a first colour coordinate for each of said pixels of said picture;

means for defining a second m-dimensional device dependent colour space in which colour contributions expressed in terms of coordinates in said second colour space correspond to those of m colours of non-standard printing inks, said second colour space having a colour gamut;

means for selecting a set of p (p≧n) different colours among said colour gamut of said second colour space, each of said p colours being separated by at least a predetermined colour distance from each other;

means for determining a first colour table representing, for each colour of said selected set of p different colours, colour contributions expressed in terms of coordinates in said first colour space;

means for determining a second colour table representing, for each colour of said selected set of p different colours, colour contributions expressed in terms of coordinates in said second colour space;

means for forming a first p by p matrix having as a $p_{ij}^{th}$ (1≦i≦p; 1≦j≦p) matrix coefficient a $j^{th}$ colour coordinate of an $i^{th}$ colour within said first table;

means for forming a second m by p matrix by first inverting said first matrix and by forming m third p by 1 matrices, each of said third matrices having as coefficients a respective $q^{th}$ (1≦q≦m) one of said colour coordinates in said second colour space of each of said colours belonging to said selected set of p different colours, said second matrix having as $q^{th}$ (1≦q≦m) row coefficients the transposed result of multiplying said inverted first matrix with a respective one of said third matrices; and means for determining a second colour coordinate within said second colour space for each of said pixels of said picture by multiplying said second matrix by said first colour coordinate.

13. A device as claimed in claim 12, further comprising:

means for transforming, for each of said pixels of said picture, said first colour coordinate into a first mapped colour coordinate by means of a first predetermined mapping fixing a predetermined relation between said first device dependent colour space and a first device independent colour space;

means for transforming, for each of said pixels of said picture, said second colour coordinate into a second mapped colour coordinate by means of a second predetermined mapping fixing a predetermined relation between said second device dependent colour space and a second device independent colour space;

means for forming in said second device independent colour space a target colour coordinate by mapping said first mapped colour coordinate towards said second device independent colour space;

means for determining a target function with respect to a difference between said target colour coordinate and said second mapped colour coordinate;

means for minimizing said target function in order to obtain an adjusted second colour coordinate by transforming said second colour coordinate with said minimised target function; and means for substituting said adjusted second colour coordinate for said second colour coordinate for each of said pixels of said picture.

14. A device according to claim 13, further comprising a memory for storing said second matrix and said second colour coordinate and said difference between said target colour coordinate and said second colour coordinate.

15. A device according to claim 14, wherein tables are stored in said memory, a corresponding set of non-standard printing inks being associated to each table, said device further comprising:

means for storing said second colour coordinate corresponding to said first colour coordinate of said set of m non-standard printing inks in a corresponding table, as obtained by minimising said difference between target colour coordinate and second mapped colour coordinate;

means for determining a set of first colour coordinates for each of said pixels belonging to said picture and determining for said set of first colour coordinates a corresponding set of second colour coordinates by selecting for each of said first colour coordinates a corresponding second colour coordinate and a corresponding difference from a corresponding one of said tables;

means for determining for each of non-standard inks, an average value of said difference among all differences stored in said set, and among said average values the one with the lowest value is chosen and a corresponding set of non-standard inks belonging thereto is chosen, and thereafter for each first colour coordinate and said chosen set of non-standard inks, said second colour coordinate is determined by means of a table corresponding to said chosen set of non-standard inks; and selection means affected to said selection of said set of non-standard printing inks on the basis of said lowest average value difference corresponding to said second colour coordinate to be fetched.

16. A device as claimed in claim 12, further comprising:

means for forming for said picture to be printed, a first set of first colour coordinates in said first device dependent colour space;

means for forming a second set of second colour coordinates in said second device dependent colour space by multiplying each of said first colour coordinates from said first set with said second matrix;

means for forming a third set of first mapped colour coordinates by transforming each of said first colour coordinates from said first set to a corresponding first mapped colour coordinate by means of a first predetermined mapping establishing a predetermined relation between said first device dependent colour space and said first device independent colour space;

means for forming a fourth set of second mapped colour coordinates by transforming each of said second colour coordinates from said second set to a corresponding second mapped colour coordinate by means of a second predetermined mapping establishing a predetermined relation between said second device dependent colour space and said second device independent colour space;

means for forming a fifth set of target colour coordinates in said second device independent colour space by mapping towards said second device independent colour space each of said first mapped colour coordinates of said third set; and means for determining a first target function expressed in terms of coefficients of said second matrix with respect to an average of a difference between each of said target colour coordinates of said fifth set and a corresponding second mapped colour coordinate of said fourth set, said target function being thereafter minimised in order to obtain an adjusted second matrix.

* * * * *